(12) United States Patent
Murata et al.

(10) Patent No.: US 8,174,716 B2
(45) Date of Patent: May 8, 2012

(54) IMAGE FORMING APPARATUS AND IMAGE FORMING SYSTEM

(75) Inventors: Ryoji Murata, Nara (JP); Fusahiro Shiono, Osaka (JP); Yoshiaki Tanaka, Kyoto (JP)

(73) Assignee: Sharp Kabushiki Kaisha, Osaka (JP)

(*) Notice: Subject to any disclaimer, the term of this patent is extended or adjusted under 35 U.S.C. 154(b) by 1300 days.

(21) Appl. No.: 11/891,968

(22) Filed: Aug. 14, 2007

(65) Prior Publication Data
US 2008/0055641 A1 Mar. 6, 2008

(30) Foreign Application Priority Data
Sep. 4, 2006 (JP) .................. 2006-239191

(51) Int. Cl.
G06F 3/12 (2006.01)
(52) U.S. Cl. .................. 358/1.15; 358/1.1; 358/1.9
(58) Field of Classification Search .............. 358/1.15, 358/1.1, 1.9
See application file for complete search history.

(56) References Cited
U.S. PATENT DOCUMENTS
6,894,793 B1 5/2005 Roosen et al.
7,271,922 B2* 9/2007 Yamashita .................. 358/1.1
2002/0060806 A1* 5/2002 Gassho et al. ............. 358/1.15
2003/0231345 A1 12/2003 Azami FOREIGN PATENT DOCUMENTS
| JP | 10-016355 | 1/1998 |
| JP | 11-327832 | 11/1999 |
| JP | 11-327848 | 11/1999 |
| JP | 2000-276314 | 10/2000 |
| JP | 2003-122523 | 4/2003 |
| JP | 2003-285475 | 10/2003 |

* cited by examiner

Primary Examiner — King Poon
Assistant Examiner — Iriana Cruz
(74) Attorney, Agent, or Firm — David G. Conlia; Steven M. Jensen; Edwards Wildman Palmer LLP

(57) ABSTRACT

In a terminal device connected through a network to an image forming apparatus including a hold print function, the presence of an unprinted hold print job is certainly informed to a user that should print a hold print job. The terminal device includes a hold print job processing unit having a hold print job information managing unit that manages hold print job information sent from the image forming apparatus, an event receiving unit that receives event occurrence information given from an operating system when a predetermined event occurs in a personal computer, and a user interface unit, and displays a message indicating that an unprinted job exists every time the notification of occurrence of the event is sent from the OS if the unprinted hold print job exists in a list of the hold print job information in the hold print job information managing unit.

5 Claims, 18 Drawing Sheets

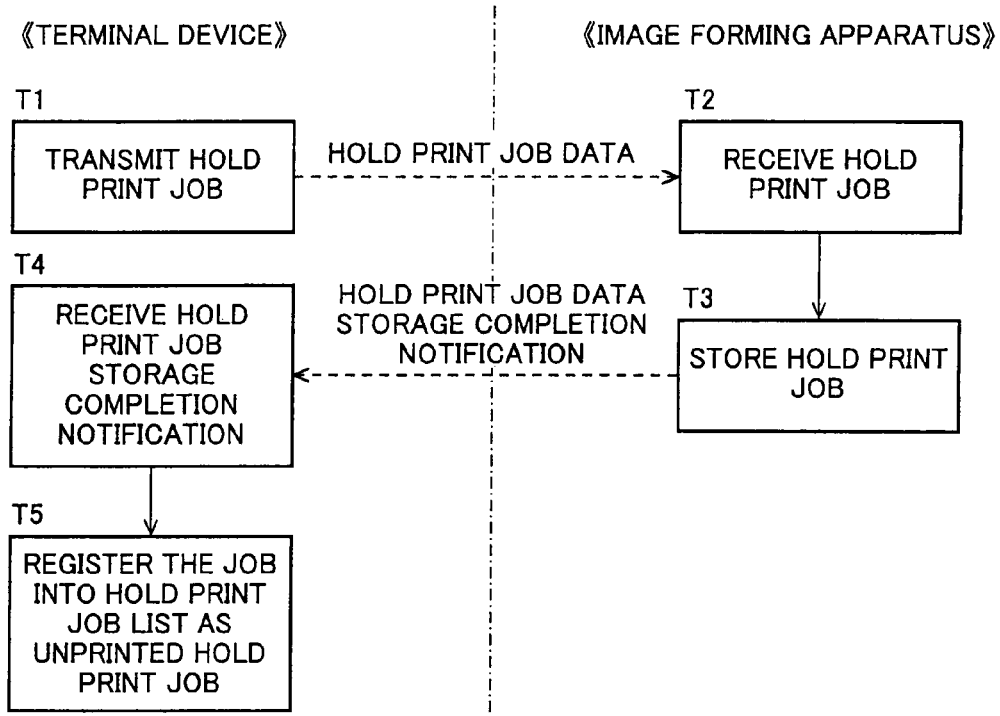
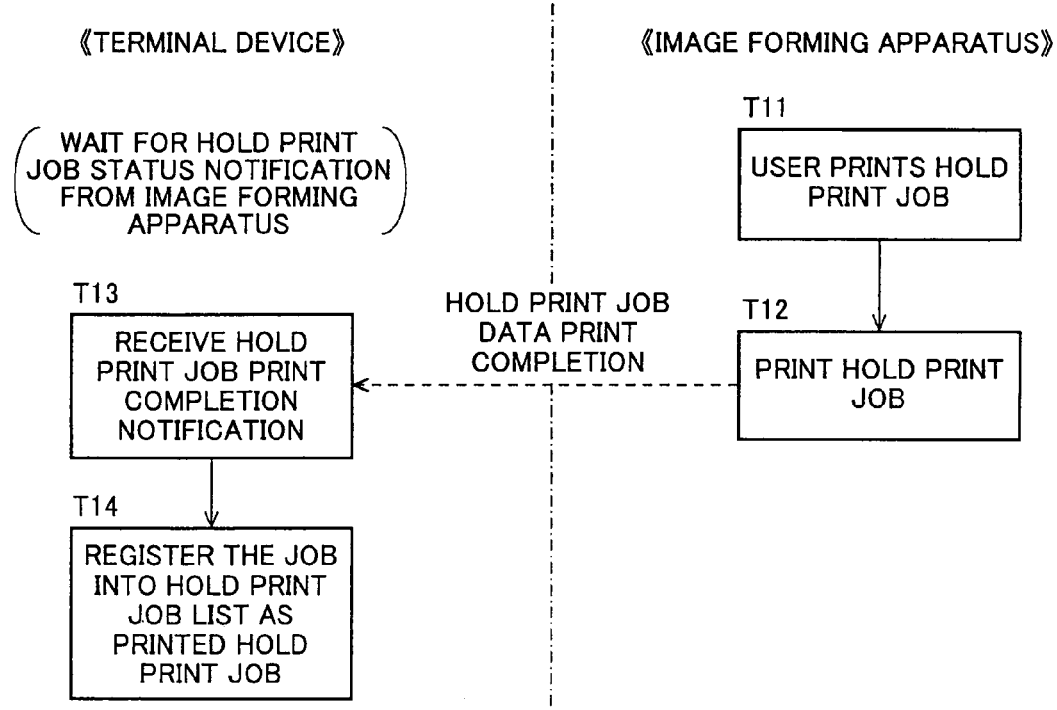

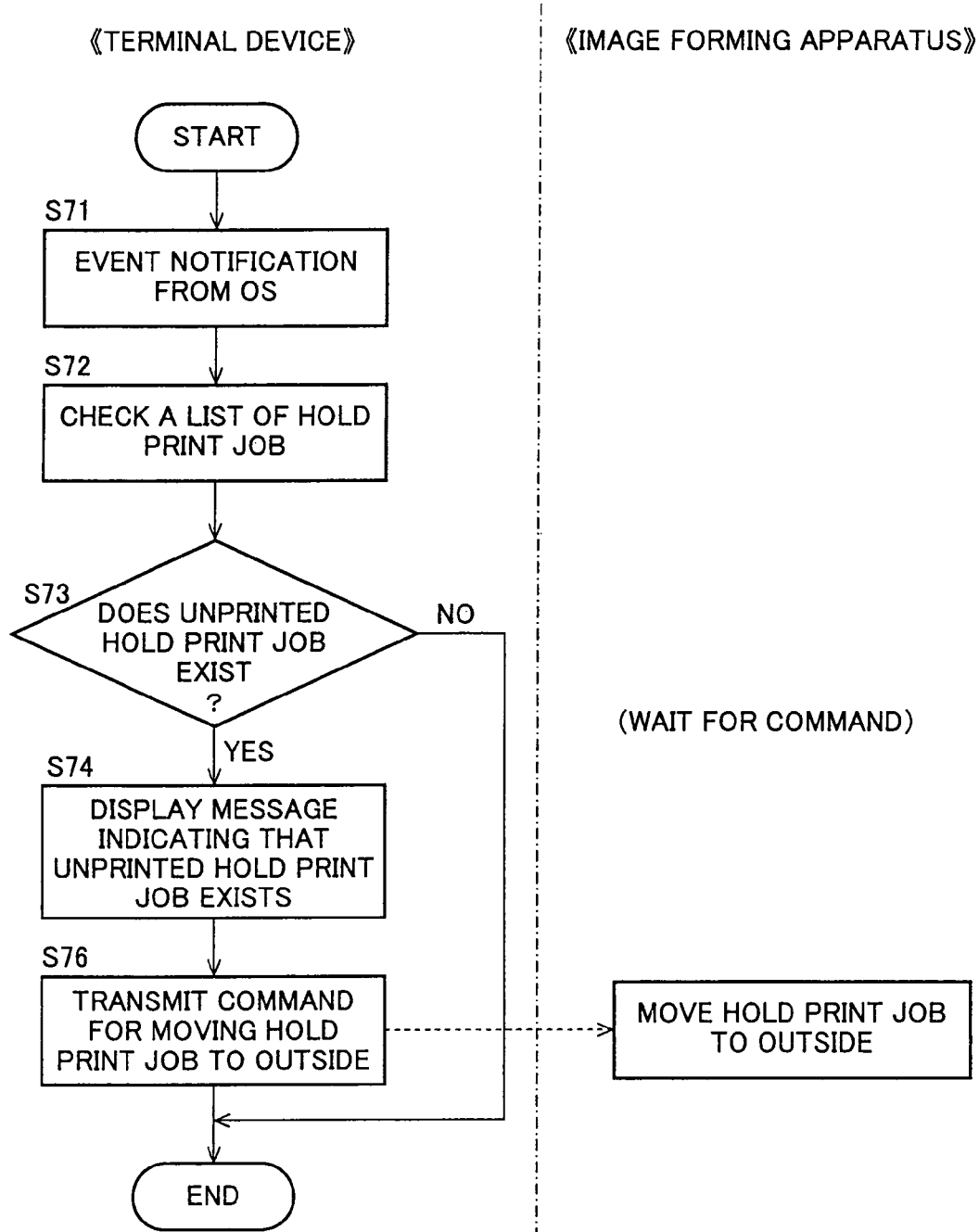

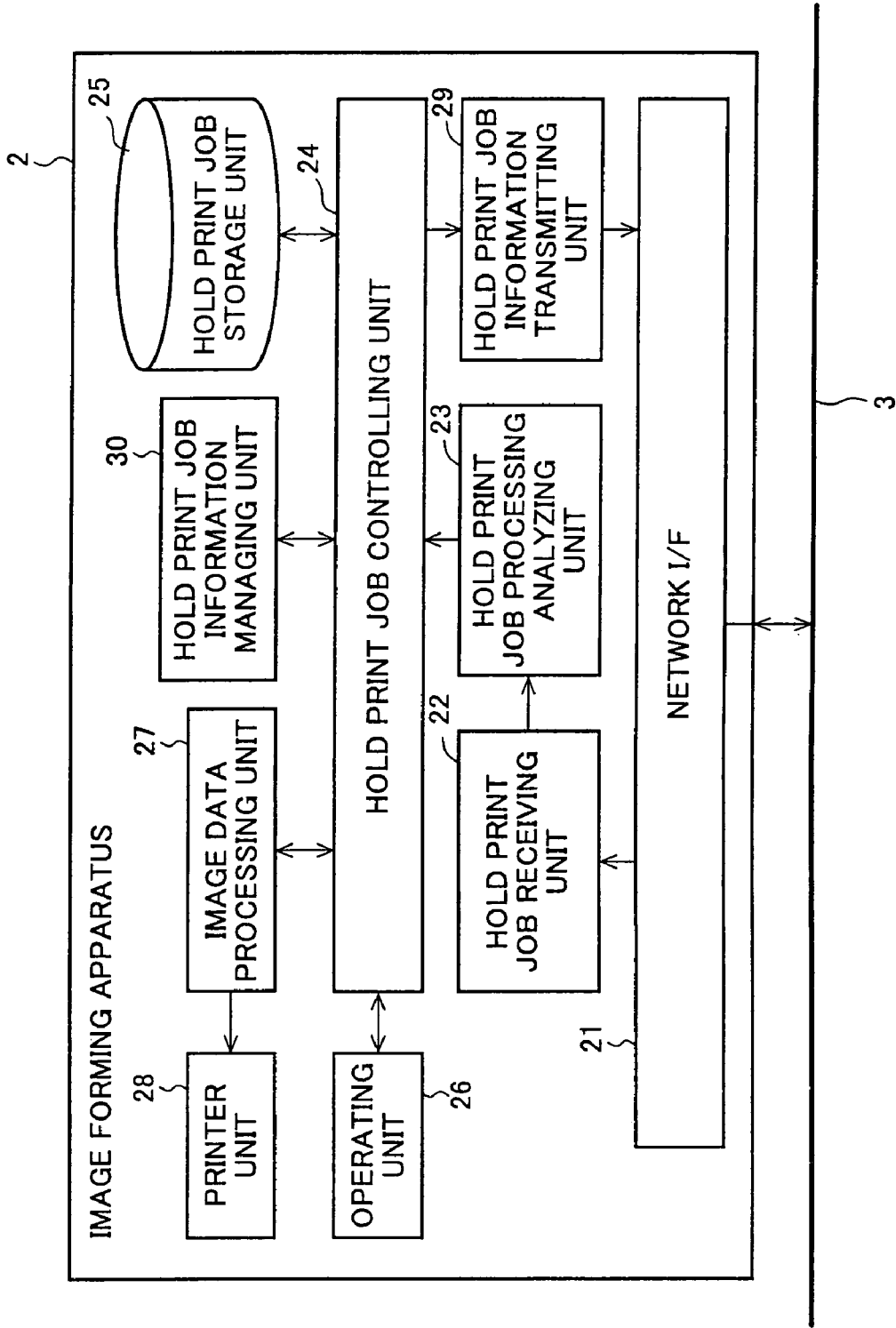

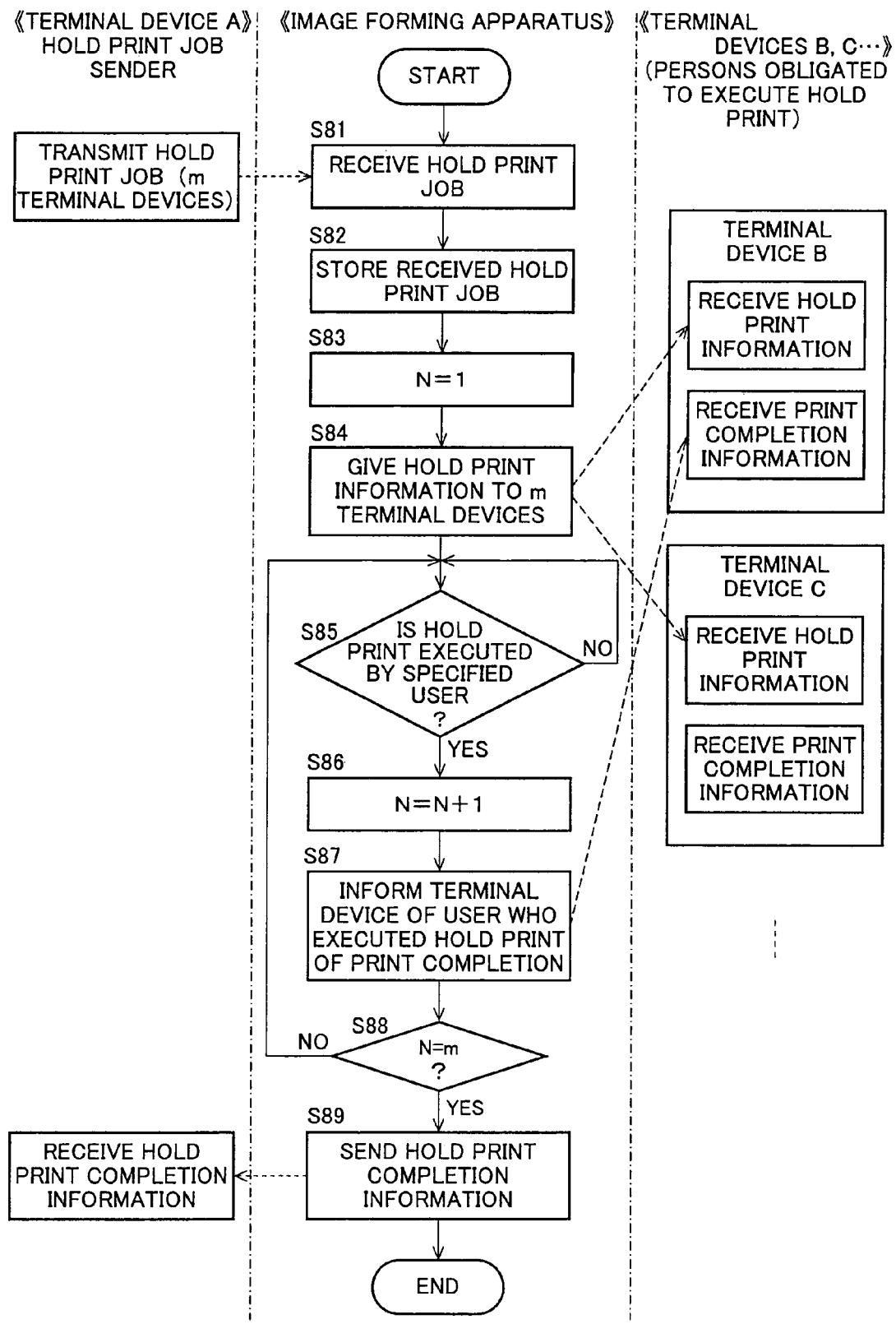

IMAGE FORMING APPARATUS AND IMAGE FORMING SYSTEM

CROSS-NOTING PARAGRAPH

This Non-provisional application claims priority under 35 U.S.C. §119 (a) on Patent Application No. 2006-239191 filed in JAPAN on Sep. 4, 2006, the entire contents of which are hereby incorporated herein by reference.

FIELD OF THE INVENTION

The present invention relates to a terminal device connected through a network to an image forming apparatus including a hold print function, an image forming apparatus including a hold print function, a hold print job informing method, an image forming system configured by connecting a terminal device and an image forming apparatus through a network, an application program that manages hold print job information, and a recording medium having the application program stored thereon.

BACKGROUND OF THE INVENTION

In a print mode referred to as hold print included in an image forming system configured by connecting a terminal device and an image forming apparatus through a network, a print job transmitted from the terminal device is stored in the image forming apparatus and the printing is executed by a user who should print the print job coming to the image forming apparatus.

When such a hold print mode is utilized, if a hold print job is forgotten by a user who should print the job, the hold print job is kept stored in a storage unit, resulting in problems such as running out of available space in a hard disk and highly confidential document data remaining in the image forming apparatus.

To solve such problems, a system is proposed that sets a retention period for a hold print job to automatically delete the data if the set retention period expires (Japanese Laid-Open Patent Publication No. 2000-276314).

However, since the deletion processing is not executed unless a retention period set for a hold print job expires in the above conventional technology, if long retention periods are set, forgotten hold print jobs are continuously accumulated and occupy the hard disk and memory of the image forming apparatus, and other functions such as scanning utilizing the hard disk may not be used.

SUMMARY OF THE INVENTION

It is the object of the present invention to make it possible to certainly inform a user who should print a hold print job of the presence of an unprinted hold print job.

A first technical means is a terminal device having an operating system, a displaying unit, and an operation input unit and connected through a network to an image forming apparatus having a hold print function, comprising: a hold print job processing unit, the hold print job processing unit including a hold print job information receiving unit that receives hold print job information transmitted from the image forming apparatus; a hold print job information managing unit that manages the received hold print job information; an event receiving unit that receives event occurrence information provided from the operating system when a predetermined event occurs in the device itself; and a user interface unit, based on the event occurrence information from the event receiving unit and unprinted information from the hold print job information managing unit, the user interface unit displaying on the displaying unit a message indicating that an unprinted hold print job exists, along with job identification information that enables identification of the held job.

A second technical means is the terminal device as defined in the first technical means, wherein the job identification information includes at least either a hold print job name or an image forming apparatus name having the hold print job stored.

A third technical means is the terminal device as defined in the first technical means, wherein the predetermined event is shutdown of the device itself.

A fourth technical means is the terminal device as defined in the first technical means, wherein the predetermined event is start-up of the device itself.

A fifth technical means is the terminal device as defined in the first technical means, wherein the predetermined event is logoff from the device itself.

A sixth technical means is the terminal device as defined in the first technical means, wherein the predetermined event is login to the device itself.

A seventh technical means is the terminal device as defined in the first technical means, wherein the predetermined event is time-out of a timer.

An eighth technical means is the terminal device as defined in the first technical means, wherein the predetermined event is shift to a power saving mode of the device itself.

A ninth technical means is the terminal device as defined in the first technical means, wherein the predetermined event is cancellation of a power saving mode of the device itself.

A tenth technical means is the terminal device as defined in the first technical means, wherein the predetermined event is activation of a screen saver of the device itself.

An eleventh technical means is the terminal device as defined in the first technical means, wherein the predetermined event is cancellation of a screen saver of the device itself.

A twelfth technical means is the terminal device as defined in the first technical means, wherein the predetermined event is pullout of an authentication card from the device itself.

A thirteenth technical means is the terminal device as defined in the first technical means, wherein the predetermined event is insertion of an authentication card into the device itself.

A fourteenth technical means is the terminal device as defined in the first technical means, wherein the hold print job processing unit further includes a command transmitting unit, wherein when a predetermined event occurs in the device itself, the hold print job information managing unit instructs the command transmitting unit to transmit a transmission request command for hold print job information, and wherein a list of hold print job information in the hold print job information managing unit is updated based on the latest hold print job information transmitted from the image forming apparatus.

A fifteenth technical means is the terminal device as defined in the fourteenth technical means, wherein when displaying the message on the displaying unit based on the updated list of hold print job information, the hold print job managing unit drives the user interface unit to display a message of whether the hold print job is deleted and selection buttons for selecting whether the hold print job is deleted as well, and wherein if deletion is selected, the hold print job managing unit drives the command transmitting unit to transmit a command for deleting the hold print job.

A sixteenth technical means is the terminal device as defined in the fourteenth technical means, wherein when displaying the message on the displaying unit, the hold print job information managing unit drives the user interface unit to also display a message indicating that the hold print job is deleted and wherein the hold print job information managing unit drives the command transmitting unit to transmit a command for deleting the hold print job.

A seventeenth technical means is the terminal device as defined in the fourteenth technical means, wherein when displaying the message on the displaying unit based on the updated list of hold print job information, the hold print job managing unit drives the user interface unit to display a message of whether the hold print job is compressed and selection buttons for selecting whether the hold print job is compressed as well, and wherein if compression is selected, the hold print job managing unit drives the command transmitting unit to transmit a command for compressing the hold print job.

An eighteenth technical means is the terminal device as defined in the fourteenth technical means, wherein when displaying the message on the displaying unit, the hold print job information managing unit drives the user interface unit to also display a message indicating that the hold print job is compressed and wherein the hold print job information managing unit drives the command transmitting unit to transmit a command for compressing the hold print job.

A nineteenth technical means is the terminal device as defined in the fourteenth technical means, wherein when displaying the message on the displaying unit based on the updated list of hold print job information, the hold print job managing unit drives the user interface unit to display a message of whether the hold print job is moved to the outside and selection buttons for selecting whether the hold print job is moved to the outside as well, and wherein if movement is selected, the hold print job managing unit drives the command transmitting unit to transmit a command for moving the hold print job to the outside.

A twentieth technical means is the terminal device as defined in the fourteenth technical means, wherein when displaying the message on the displaying unit, the hold print job information managing unit drives the user interface unit to also display a message indicating that the hold print job is moved to the outside and wherein the hold print job information managing unit drives the command transmitting unit to transmit a command for moving the hold print job to the outside.

A twenty-first technical means is a hold print job informing method of a terminal device connected through a network to an image forming apparatus having a hold print function, the method comprising the steps of: receiving information of occurrence of a predetermined event from an operating system; checking a list of hold print job information in a hold print job information managing unit; and displaying a message indicating that an unprinted hold print job exists if an unprinted hold print job exists.

A twenty-second technical means is an image forming apparatus connected through a network to a terminal device having a hold printing function, the image forming apparatus comprising: a storage unit having stored thereon a hold print job transmitted from a terminal device; and a hold print job information managing unit that manages a hold print job based on hold print job information added to the hold print job, wherein the hold print job information managing unit has a function of transmitting job identification information that enables identification of a job for an unprinted hold print job to the terminal device of a user who does not complete printing of the hold print job to be printed based on the hold print job information added to the transmitted hold print job in accordance with predetermined timing or a transmission request command from the terminal device.

A twenty-third technical means is the image forming apparatus as defined in the twenty-second technical means, wherein the job identification information includes at least a hold print job name.

A twenty-fourth technical means is the image forming apparatus as defined in the twenty-second technical means, wherein if a hold print job of which sender is different from a user that should print the job is received, the hold print job information managing unit transmits a message indicating that the hold print job to be printed has arrived, along with the job identification information that enables identification of the hold job, to the terminal device of the user that should print the job.

A twenty-fifth technical means is the image forming apparatus as defined in the twenty-fourth technical means, wherein the job identification information includes at least a hold print job sender, a hold print job name, a password for printing the hold print job, and user information that identifies the user that should print the job.

A twenty-sixth technical means is the image forming apparatus as defined in the twenty-fifth technical means, wherein if the user information is a user account, the hold print job information managing unit transmits the hold print job information to a logged-in user who logs in with that user account.

A twenty-seventh technical means is the image forming apparatus as defined in the twenty-fourth technical means, wherein if the printing term information is included in a header portion of a hold print job, the hold print job information managing unit includes the term of printing in the hold print job information transmitted to the user that should print the job.

A twenty-eighth technical means is the image forming apparatus as defined in the twenty-second technical means, wherein the hold print job information managing unit transmits a warning message indicating that the hold print job to be printed has not yet been printed to the terminal device of a user that has not executed printing a hold print job of which term of printing is coming near.

A twenty-ninth technical means is the image forming apparatus as defined in the twenty-fourth technical means, wherein if all the users that should print the job have completed their hold print jobs, the hold print job information managing unit transmits print completion information to the terminal device of the sender.

A thirtieth technical means is an image forming system in which a terminal device is connected through a network to an image forming apparatus including a storage unit to store a hold print job, wherein the terminal device includes functions of acquiring information of an unprinted hold print job from the image forming apparatus when a predetermined event occurs in the device itself and informing a user of a message indicating that the unprinted hold print job exists, along with job identification information that enables identification of the hold print job, and the image forming apparatus manages the hold print job information of the hold print job stored in the storage unit and has the unprinted hold print job according to a transmission request from the terminal device.

A thirty-first technical means is an application program including a procedure for realizing on the device itself the functions of the hold print job processing unit in the terminal device as defined in the first or second technical means.

A thirty-second technical means is a recording medium in which the application program as defined in the thirty-first technical means is stored in a computer readable form.

BRIEF DESCRIPTION OF THE DRAWINGS

FIG. 4 is a process sequence diagram in the case of transmitting a hold print job from the terminal device to the image forming apparatus;

FIG. 5 is a process sequence diagram in the case of printing the hold print job in the image forming apparatus;

FIG. 19 is a flow diagram in the case of transmitting a command for outwards movement concurrently with displaying a message informing that an unprinted hold print job exists;

FIG. 20 is a block diagram of an image forming apparatus according to a second embodiment; and FIG. 21 is an explanatory flow diagram of processing operations of the image forming apparatus according to the second embodiment.

PREFERRED EMBODIMENTS OF THE INVENTION

Figure 1:
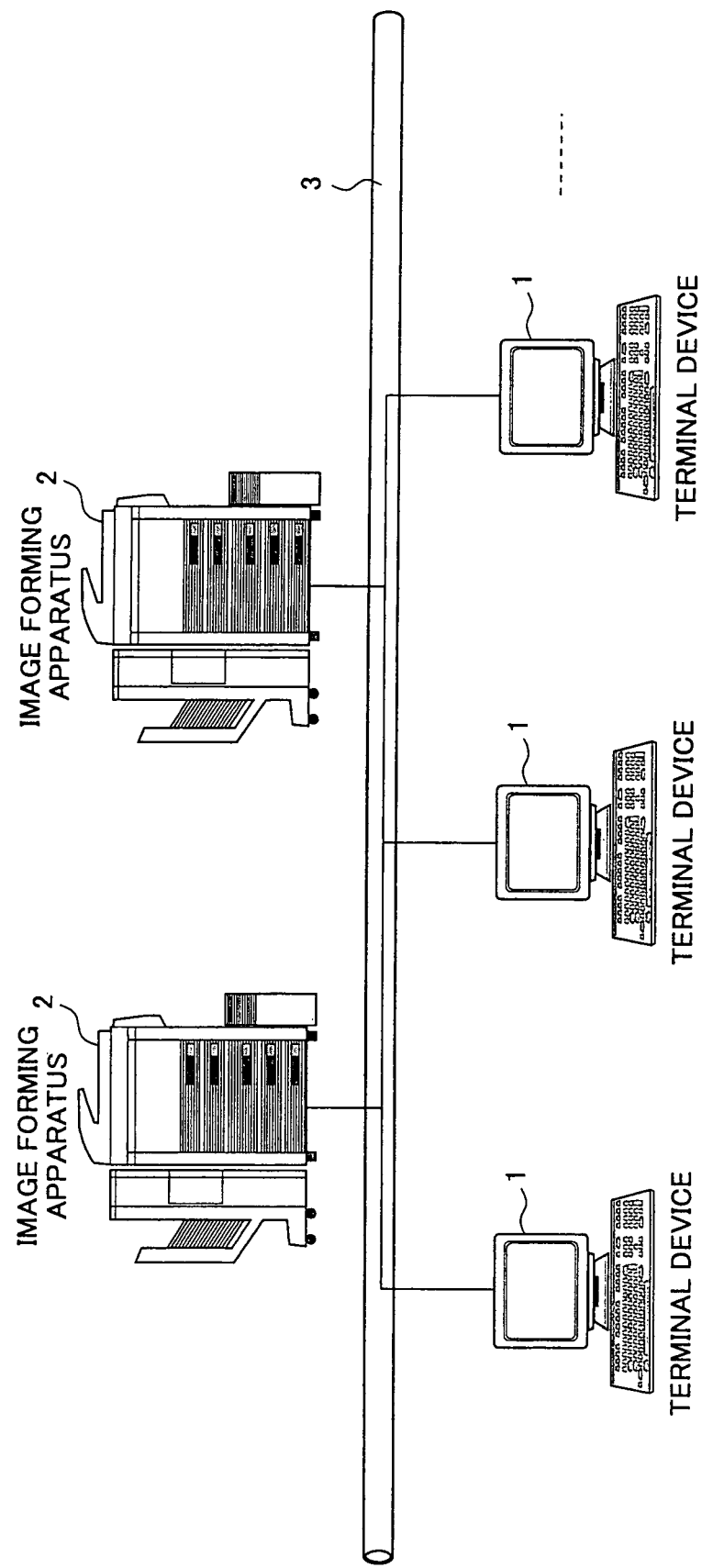
FIG. 1 depicts a configuration of an image forming system to which the present invention is applied.

FIG. 1 depicts a configuration of an image forming system to which the present invention is applied, and terminal devices 1 capable of transmitting hold print jobs are connected to a network 3 along with image forming apparatuses 2 that are digital multifunction peripherals including various functions such as a hold print function.

Figure 2:
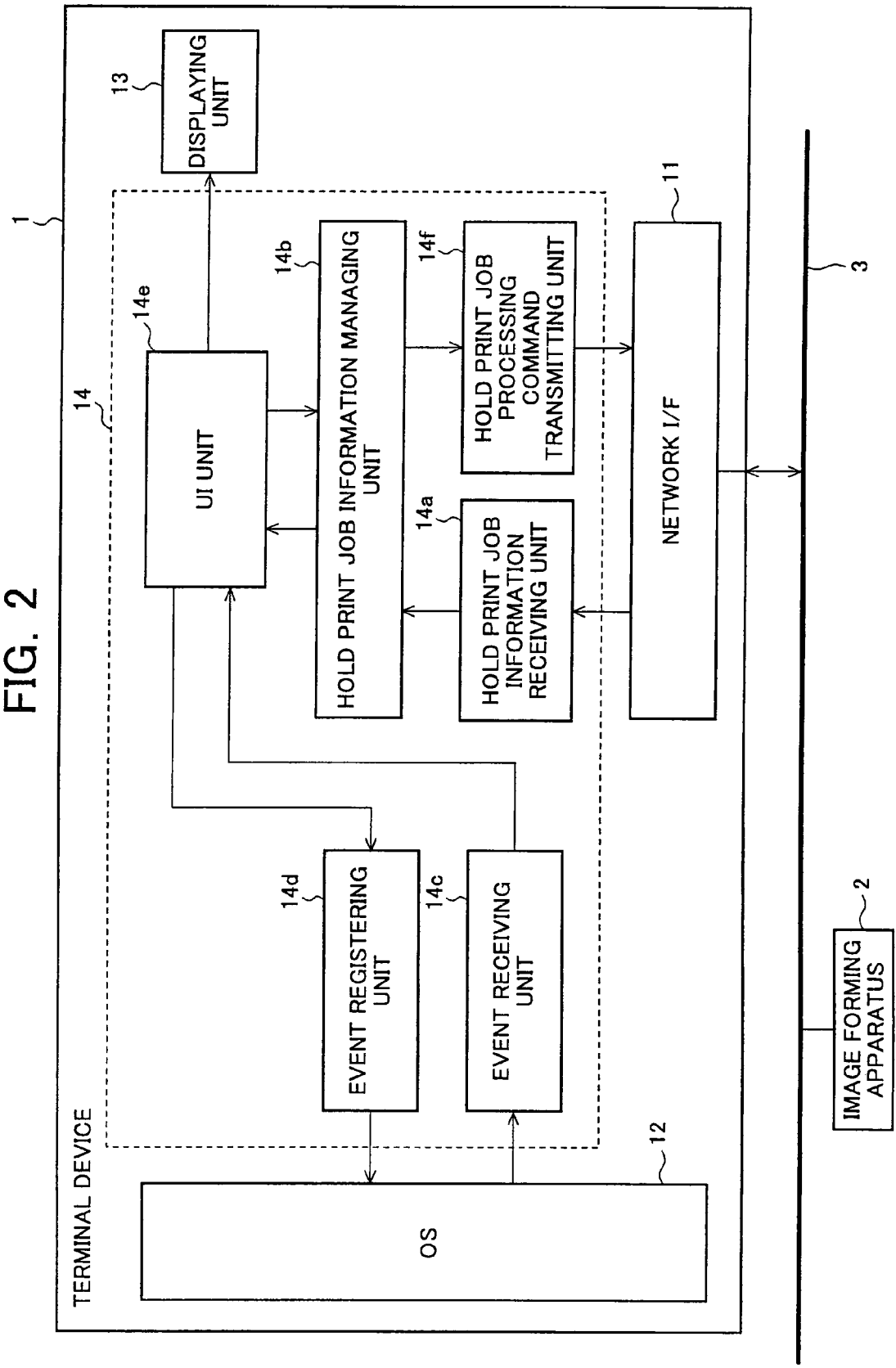
FIG. 2 is a block configuration diagram of a terminal device according to a first embodiment.

FIG. 2 is a block diagram of a configuration of a terminal device according to a first embodiment, and a terminal device 1 is a personal computer and includes a hold print job processing unit 14 of which functions are realized on the terminal device by executing an application program, in addition to a network interface 11, an operating system 12, and a displaying unit 13, which are typically included in the terminal device.

The hold print job processing unit 14 includes: a hold print job information receiving unit 14a that receives hold print job information transmitted from the image forming apparatus 2; a hold print job information managing unit 14b that manages the hold print job information; an event receiving unit 14c that receives an event notification from the operating system 12 when a predetermined event occurs in the terminal device 1; an event registering unit 14d that registers a predetermined event into the operating system 12; a user interface unit 14e; and a hold print job processing command transmitting unit 14f.

The hold print job information managing unit 14b has a function of checking a list of managed hold print job information (see FIG. 6) if the event receiving unit 14c receives event occurrence information and giving an instruction to the user interface unit 14e to display on the displaying unit 13 a message indicating the presence of an unprinted hold print job if an unprinted hold print job exists. The hold print job information managing unit 14b also has a function of giving an instruction to the hold print job processing command transmitting unit 14f to transmit a transmission request command for the hold print job information to the image forming apparatus at the time of the shutdown or start-up of the terminal device 1 or at the time of occurrence of a predetermined event such as logoff or login.

Figure 3:
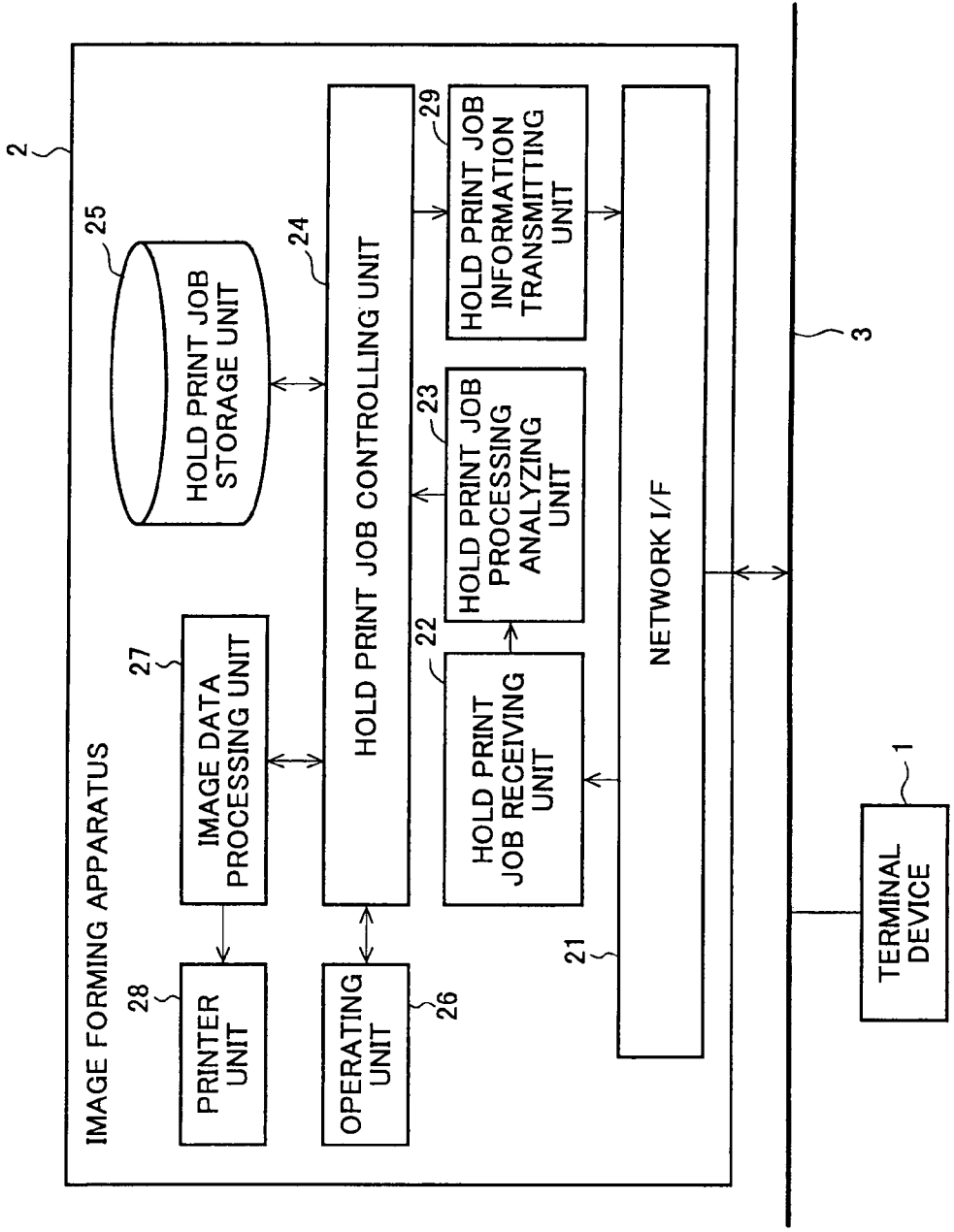
FIG. 3 is a block diagram of an image forming apparatus according to the first embodiment.

FIG. 3 is a block diagram of an image forming apparatus according to the first embodiment. The image forming apparatus 2 includes: a network interface 21 connected to the network 3; a hold print job receiving unit 22 that receives a hold print job; a hold print job processing analyzing unit 23 that analyzes a received hold print job and extracts from a header portion thereof the hold print job information such as a provider of the hold print job, a hold print job name, and a password for printing the hold print job to execute a predetermined processing; a hold print job controlling unit 24 that controls the processing on hold print jobs; a hold print job storage unit 25 that stores the received hold print jobs; an operating unit 26 that is used for performing various input operations such as inputting a job name and a password when performing the hold print of a stored hold print job; an image data processing unit 27 that expands transmitted print data into a bitmap; a printer unit 28 that executes a print processing based on the data expanded to the bitmap; and a hold print job information transmitting unit 29 that transmits the hold print job information to a terminal device.

FIG. 4 is a process sequence diagram in the case of transmitting a hold print job from the terminal device 1 to the image forming apparatus 2, and when a hold print job is transmitted from the terminal device 1 to the image forming apparatus 2 (T1), the image forming apparatus 2 receives the hold print job (T2), stores the received hold print job into the hold print job storage unit 25 (T3), and transmits a hold print job storage completion notification to the terminal device 1. When the terminal device 1 receives the storage completion notification (T4), it registers the job as an unprinted hold print job into a list of hold print job information stored in a memory of the hold print job information managing unit 14b (T5).

Figure 6:
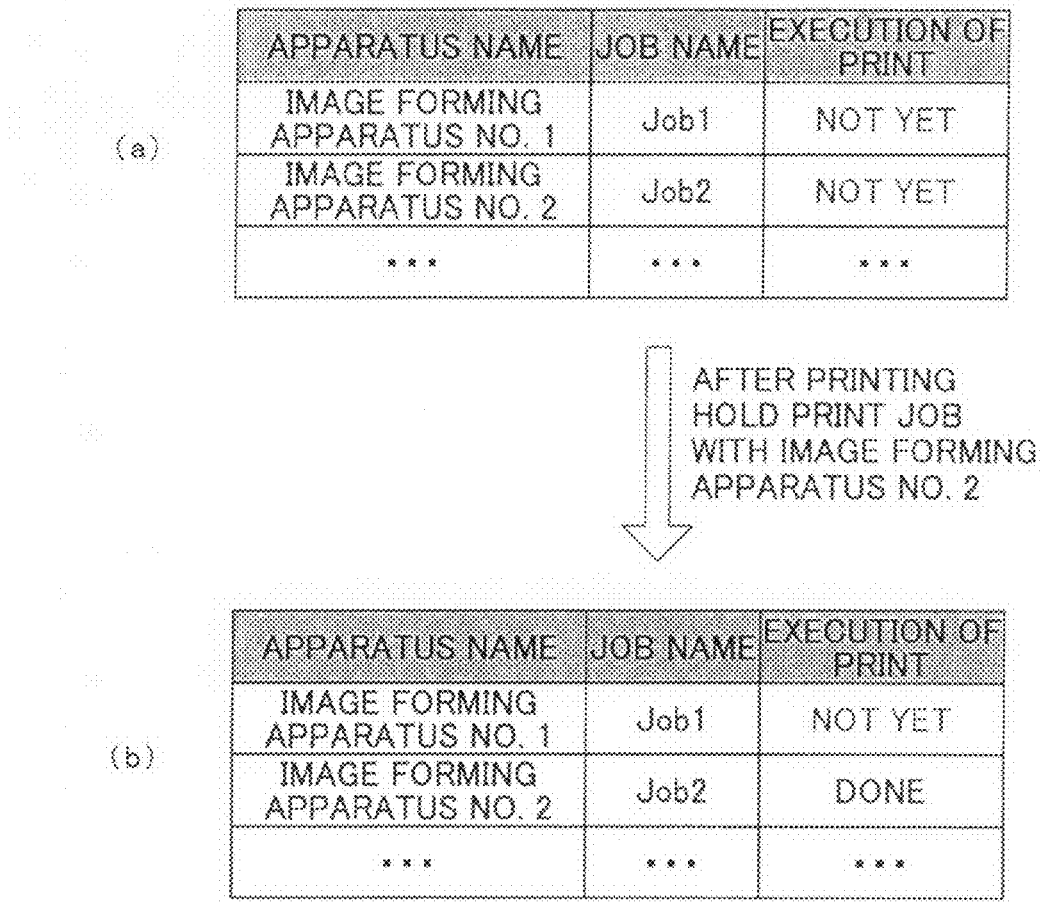
FIG. 6 is an explanatory diagram of a list of hold print job information in a hold print job information managing unit.

FIG. 5 is a process sequence diagram in the case of printing the hold print job. When a user inputs user information such as a user ID and a terminal device name and a password of the job, etc., in the image forming apparatus, selects the relevant hold print job and executes a printing processing (T11), and the printing processing is completed (T12), a print completion notification is transmitted to the terminal device of the user. When the terminal device 1 receives the print completion notification from the image forming apparatus 2 (T13), the job is registered as a printed hold print job in a hold print job list of the hold print job information managing unit 14*b*. FIG. 6 shows that a sign in a space indicating print execution for the image forming apparatus No. 2 on the list of the hold print job information in the hold print job information managing unit 14*b* is changed from "NOT YET" ((a) of FIG. 6) to "DONE" ((b) of FIG. 6).

Figure 7:
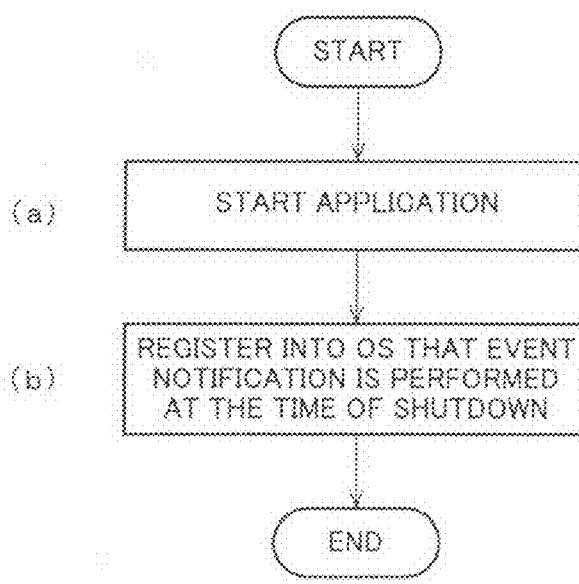
FIG. 7 is a flow diagram in the case of registering a predetermined event into an operating system.

FIG. 7 is a flow diagram in the case of preliminarily registering in the operating system a type of event that causes the terminal device to display a message informing that an unprinted hold print job exists when the event occurs in the terminal device. For example, if "shutdown" is input through a keyboard (not shown) when the above application program realizing the functions of the hold print job processing unit 14 is operated (a), the shutdown of the terminal device is registered as the event in the event registering unit 14*d* through the user interface 14*e* (b).

Although the predetermined events utilized in the present invention include: the start-up of the terminal device; login to the terminal device; the logoff from the terminal device; the periodic time-out before occurrence of events due to operations such as logoff and login from the terminal device and a shutdown; the shift to a power saving mode of the terminal device; the cancellation of the power saving mode of the terminal device; the activation of a screen saver of the terminal device; the cancellation of the screen saver of the terminal device; the pullout of an authentication card from the terminal device; and the insertion of the authentication card into the terminal device, flow diagrams and description of these cases will be omitted since flows of the registration processes thereof are the same as that shown in FIG. 7.

Figure 8:
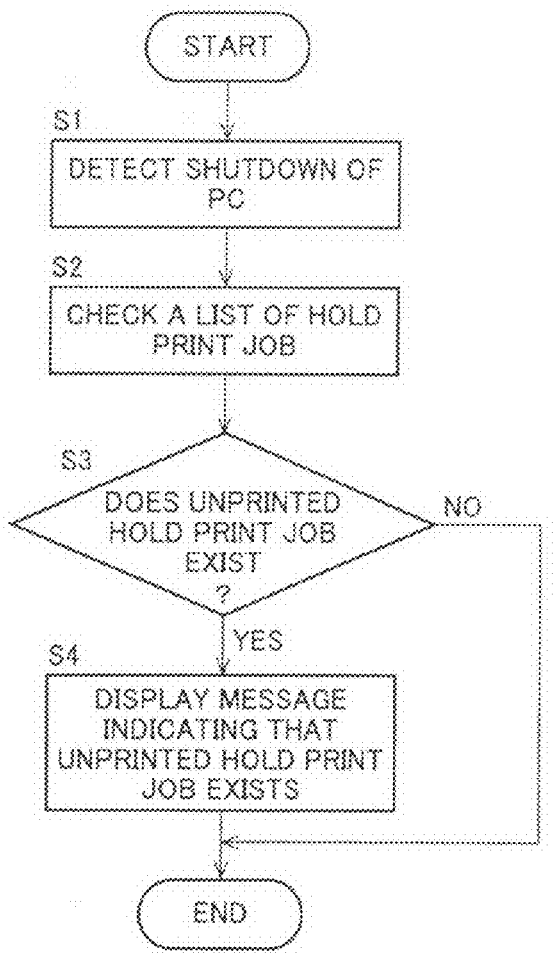
FIG. 8 is a flow diagram in the case of displaying a message informing that an unprinted hold print job exists at the time of the shutdown of the terminal device.

FIG. 8 is a flow diagram of the hold print job processing unit 14 in the case of displaying on the terminal device a message informing that an unprinted hold print job exists at the time of the shutdown of the terminal device. In the terminal device 1 of FIG. 2, when the event receiving unit 14*c* detects the shutdown of the terminal device by the event notification from the operating system 12 (step S1), the list of the hold print job information in the hold print job information managing unit 14*b* is checked (step S2); if an unprinted hold print job exists (step S3/Y), an message to inform that the unprinted hold print job exists (see FIG. 9) is displayed on the displaying unit 13 (step S4); and if no unprinted hold print job exists, the flow is terminated.

Figure 9:
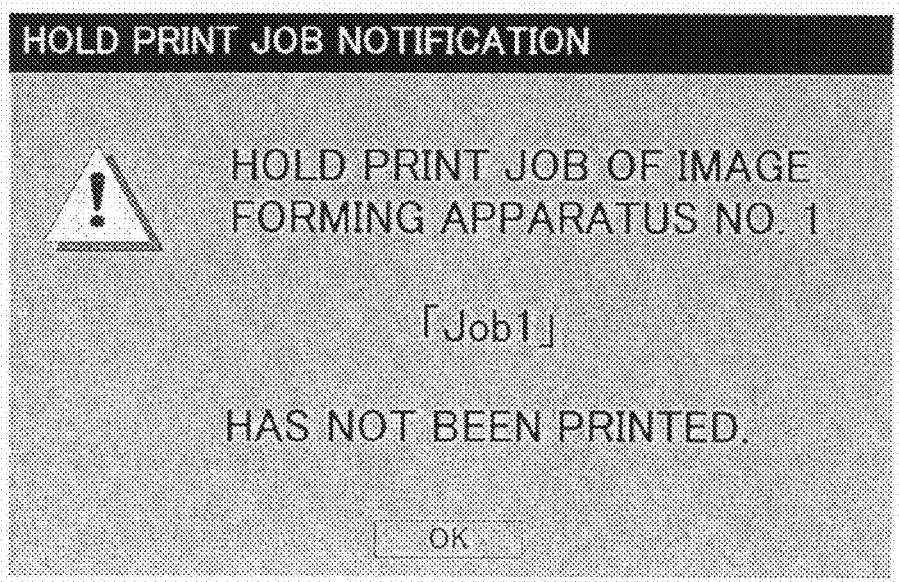
FIG. 9 depicts a display example of a message informing that an unprinted hold print job exists.
Figure 10:
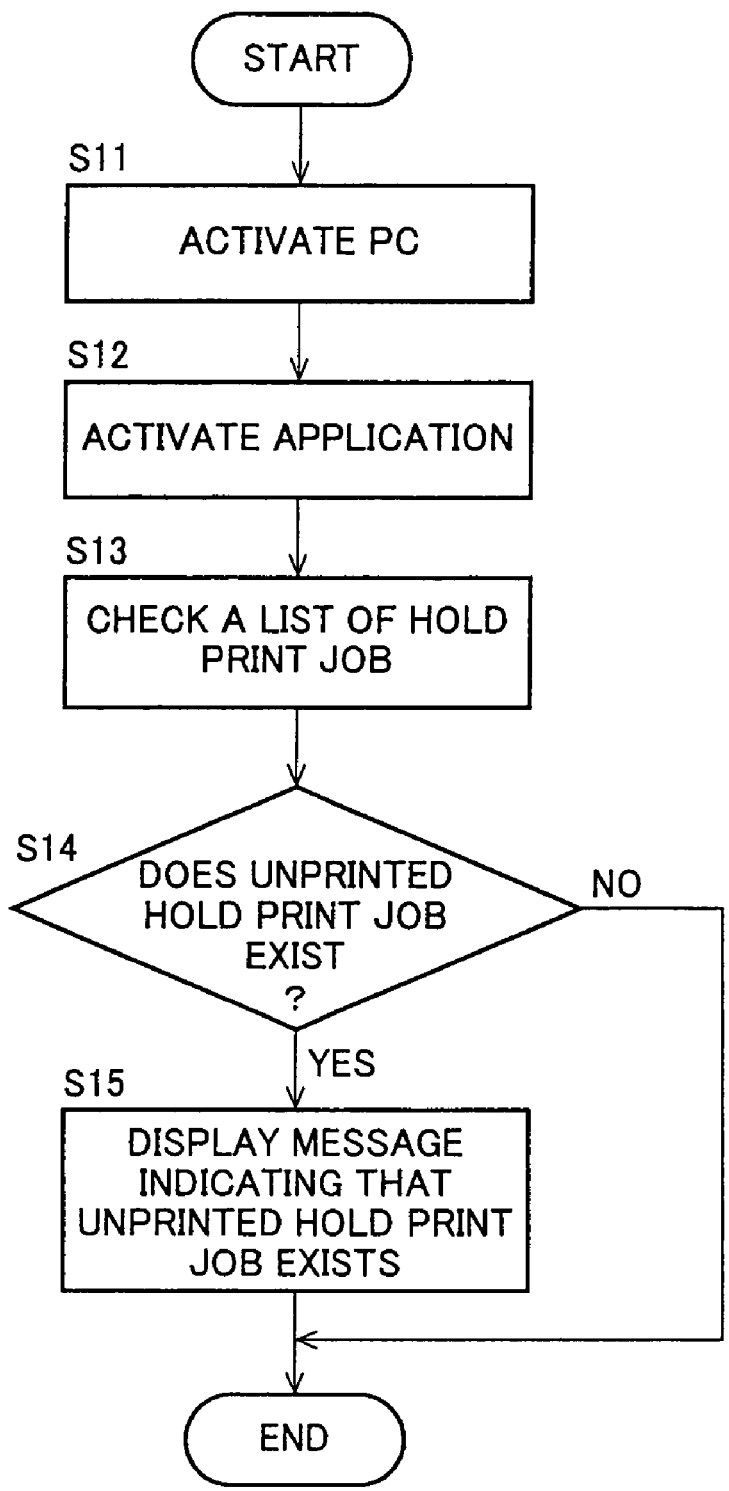
FIG. 10 is a flow diagram in the case of displaying a message informing that an unprinted hold print job exists at the time of the start-up of the terminal device.

FIG. 10 is a process flow diagram of the hold print job processing unit 14 in the case of defining the start-up of the terminal device as the above event; when the terminal device is started (step S11) and the above application program realizing the functions of the hold print job processing unit 14 on the terminal device (step S12) is operated, the list of the hold print job information in the hold print job information managing unit 14*b* is checked (step S13); if an unprinted hold print job exists (step S14/Y), an message shown in FIG. 9 is displayed on the displaying unit 13 in the same manner as shown in FIG. 8 (step S15); and if no unprinted hold print job exists, the flow is terminated.

Since the same flow is applied to the logoff from the terminal device, the login from the terminal device, the shift to the power saving mode of the terminal device, the cancellation of the power saving mode of the terminal device, the activation of the screen saver of the terminal device, the insertion of the authentication card into the terminal device, the pullout of the authentication card from the terminal device, and the cancellation of the screen saver of the terminal device, which are utilized as the predetermined events in the present invention, the flow diagrams and descriptions thereof will be omitted.

Figure 11:
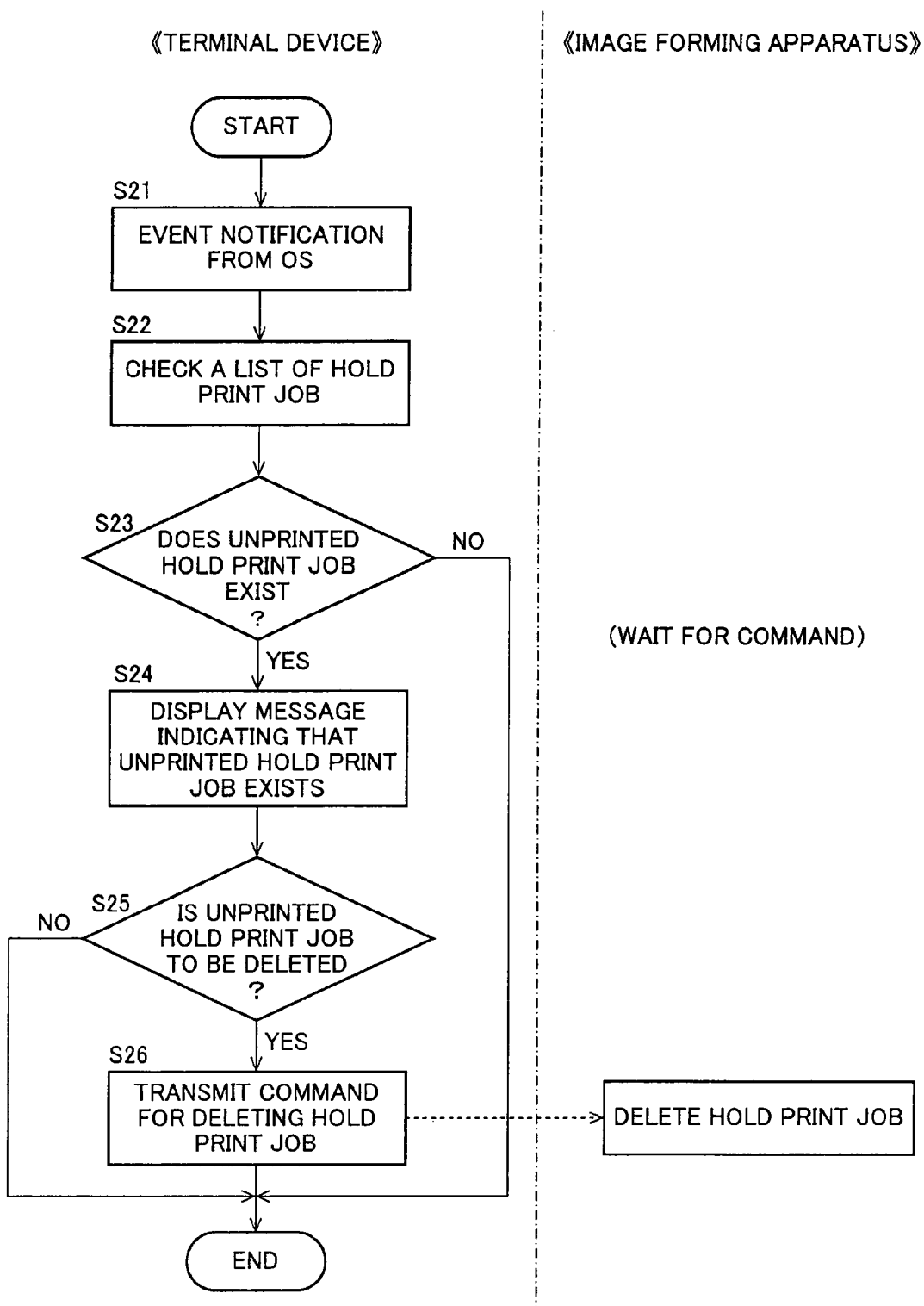
FIG. 11 is a flow diagram in the case of making deletion specification selectable when displaying a message informing that an unprinted hold print job exists.
Figure 12:
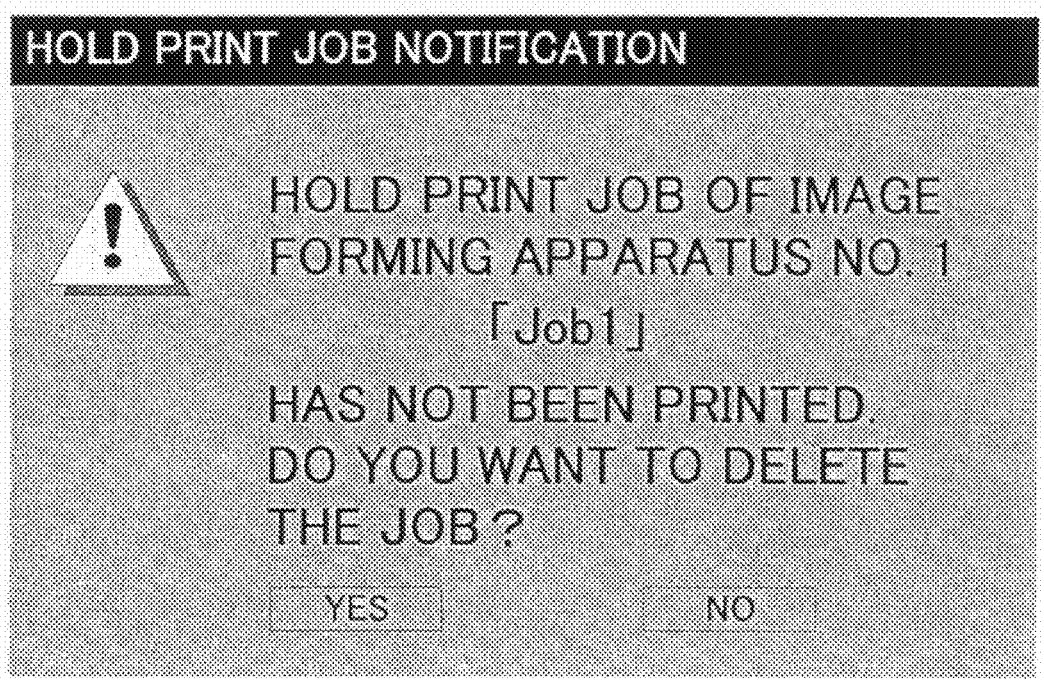
FIG. 12 depicts a display example in the case of making deletion specification selectable when displaying a message informing that an unprinted hold print job exists.

FIG. 11 is a process flow of the hold print job processing unit 14 in the case of displaying the message informing that an unprinted hold print job exists and making deletion specification of the hold print job selectable. When the event notification from the operating system 12 exists (step S21), the list of the hold print job information in the hold print job information managing unit 14*b* is checked (step S22); if an unprinted hold print job exists (step S23/Y), a screen shown in FIG. 12 is displayed which includes selection buttons (YES, NO) that enables selection of whether the hold print job is deleted in addition to the message indicating that an unprinted hold print job exists (step S24); and if the deletion is selected (step S25/Y), a command for deleting the hold print job is transmitted from the hold print job processing command transmitting unit 14*f* to the relevant image forming apparatus (step S26). In the image forming apparatus 2, the hold print job controlling unit 24 executes a processing of deleting the relevant hold print job from the hold print job storage unit 25.

Figure 13:
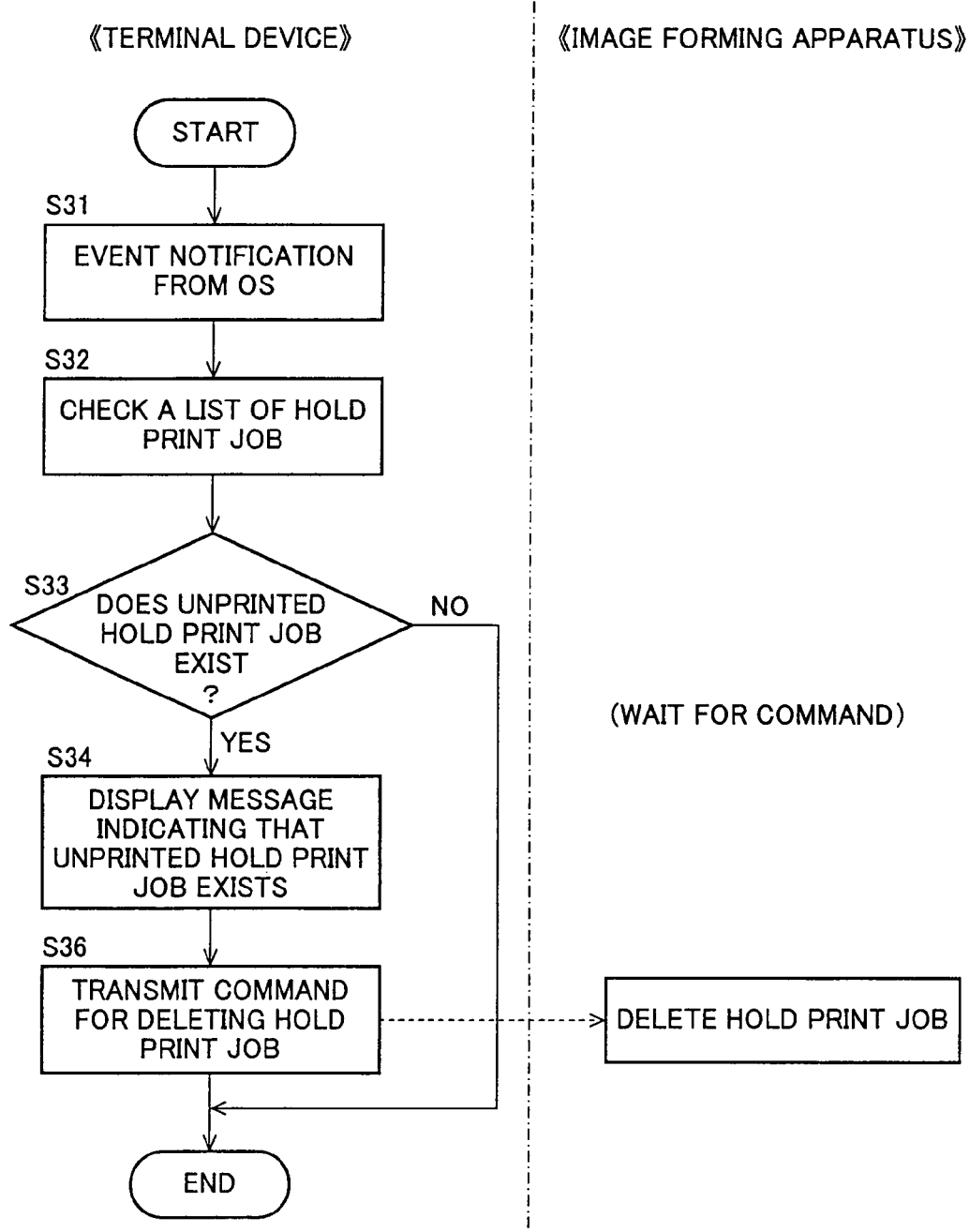
FIG. 13 is a flow diagram in the case of transmitting a command for deletion concurrently with displaying a message informing that an unprinted hold print job exists.

FIG. 13 is a flow of automatically transmitting the deletion command concurrently with displaying the message indicating that an unprinted hold print job exists. That is, in this example, the unprinted hold print job is forced to be deleted without allowing a user to select whether the unprinted hold print job is deleted, and the description thereof will be omitted since the flow in FIG. 13 becomes to be the same as that shown in FIG. 11 by eliminating the step S25 from the flow of FIG. 11 (step S35 does not exist in the flow of FIG. 13).

Figure 14:
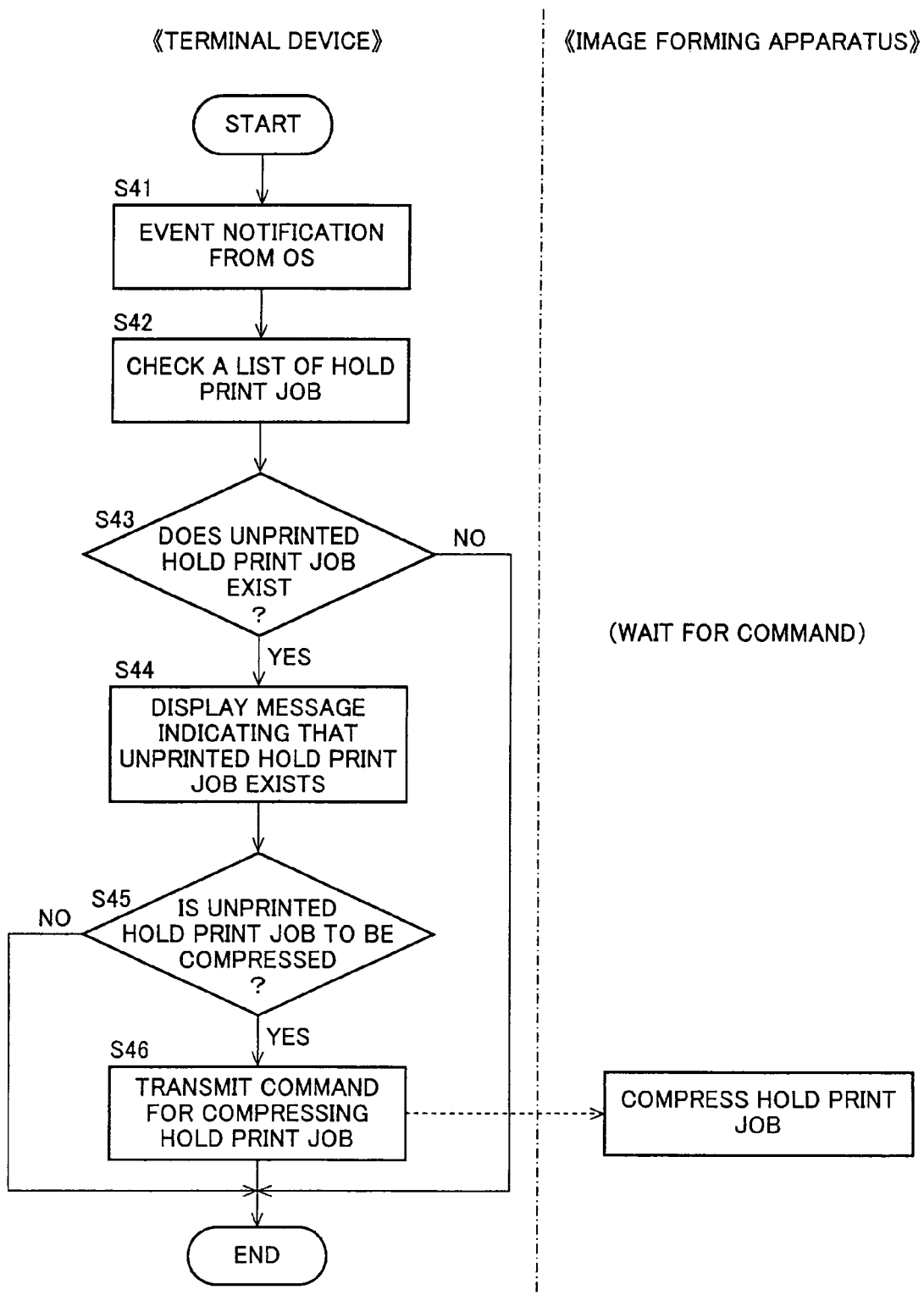
FIG. 14 is a flow diagram in the case of making compression specification selectable when displaying a message informing that an unprinted hold print job exists.
Figure 15:
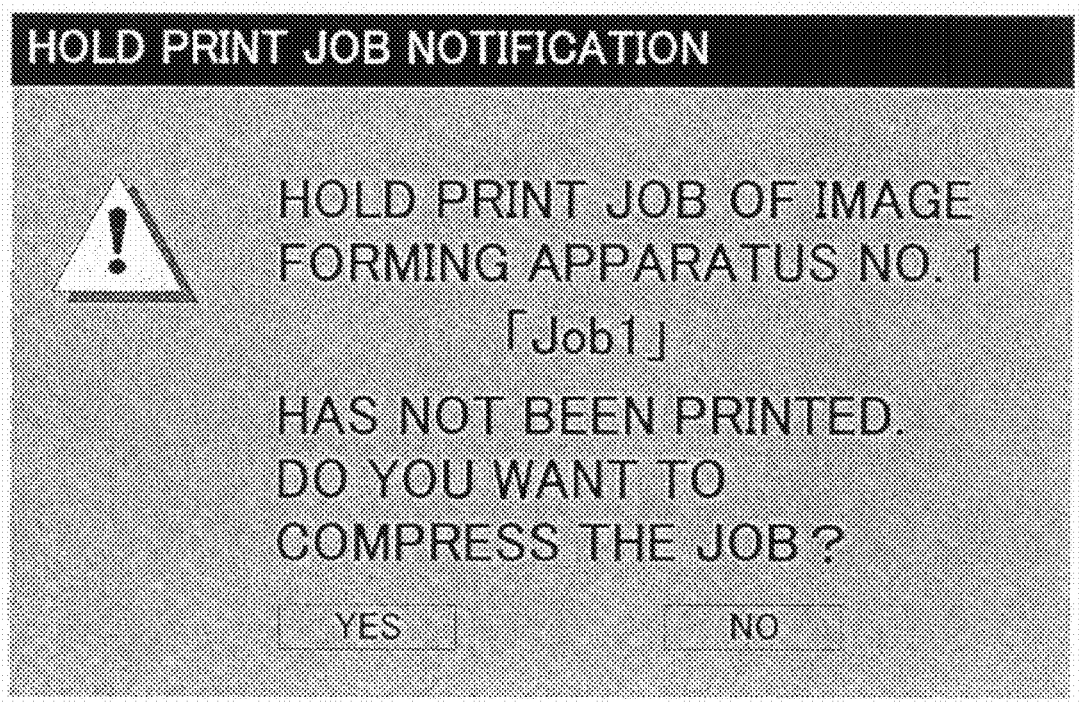
FIG. 15 depicts a display example in the case of making compression specification selectable when displaying a message informing that an unprinted hold print job exists.
Figure 16:
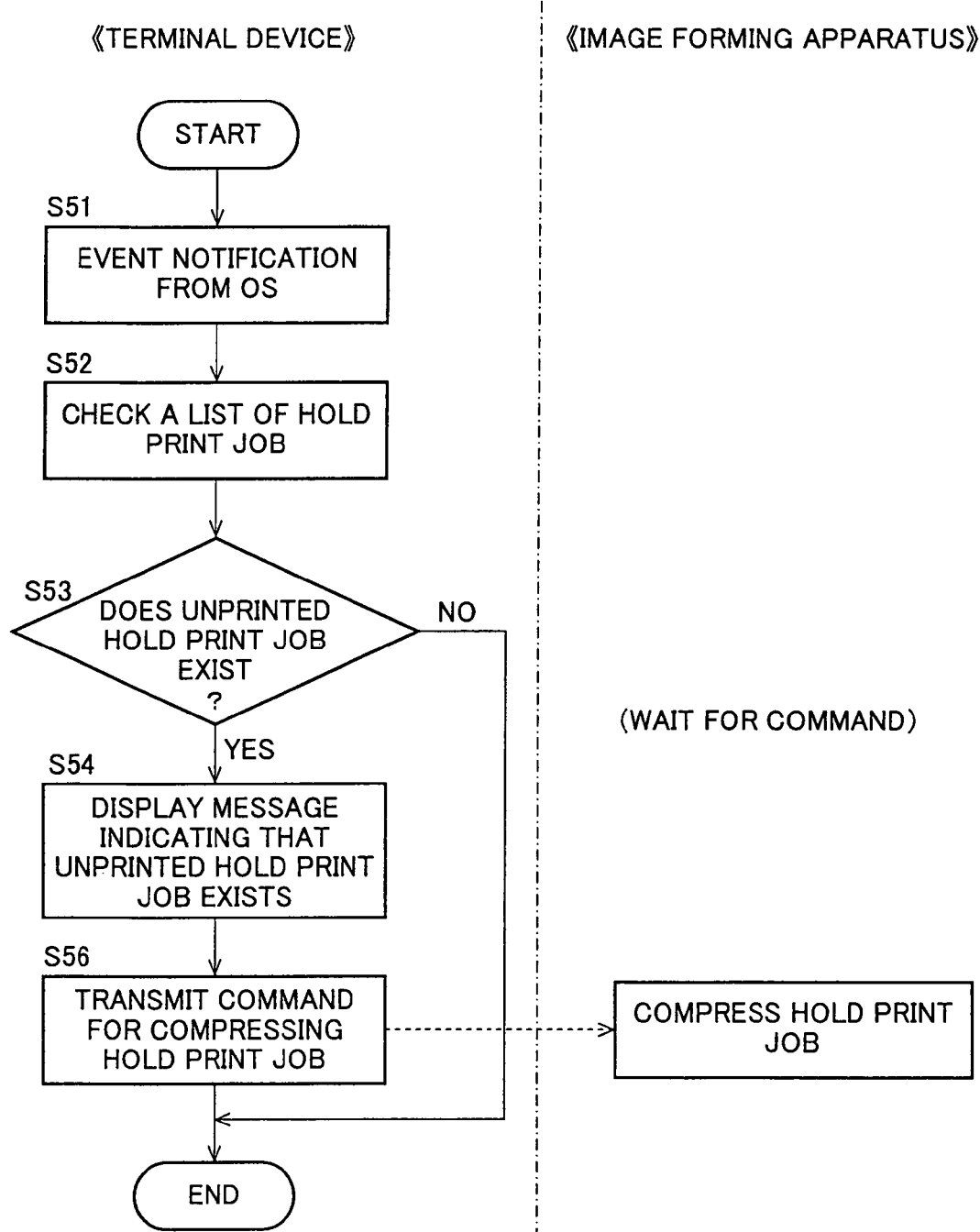
FIG. 16 is a flow diagram in the case of transmitting a command for compression concurrently with displaying a message informing that an unprinted hold print job exists.

FIG. 14 is a process flow of the hold print job processing unit 14 displaying the message informing that an unprinted hold print job exists and enabling compression specification of the hold print job, and the description thereof will be omitted since the flow becomes to be the same as that shown in FIG. 11 by replacing "deletion" of the hold print job at steps S25 and S26 of the flow diagram of FIG. 11 with "compression" at steps S45 and S46 of FIG. 14. FIG. 15 depicts a display example in the case of making the compression instruction selectable. FIG. 16 is a flow of automatically transmitting the compression command concurrently with displaying the message indicating that an unprinted hold print job exists, and the description thereof will be omitted since the flow becomes to be the same as that shown in FIG. 14 by eliminating the step S45 from the flow of FIG. 14 (step S55 does not exist in the flow of FIG. 16).

Figure 17:
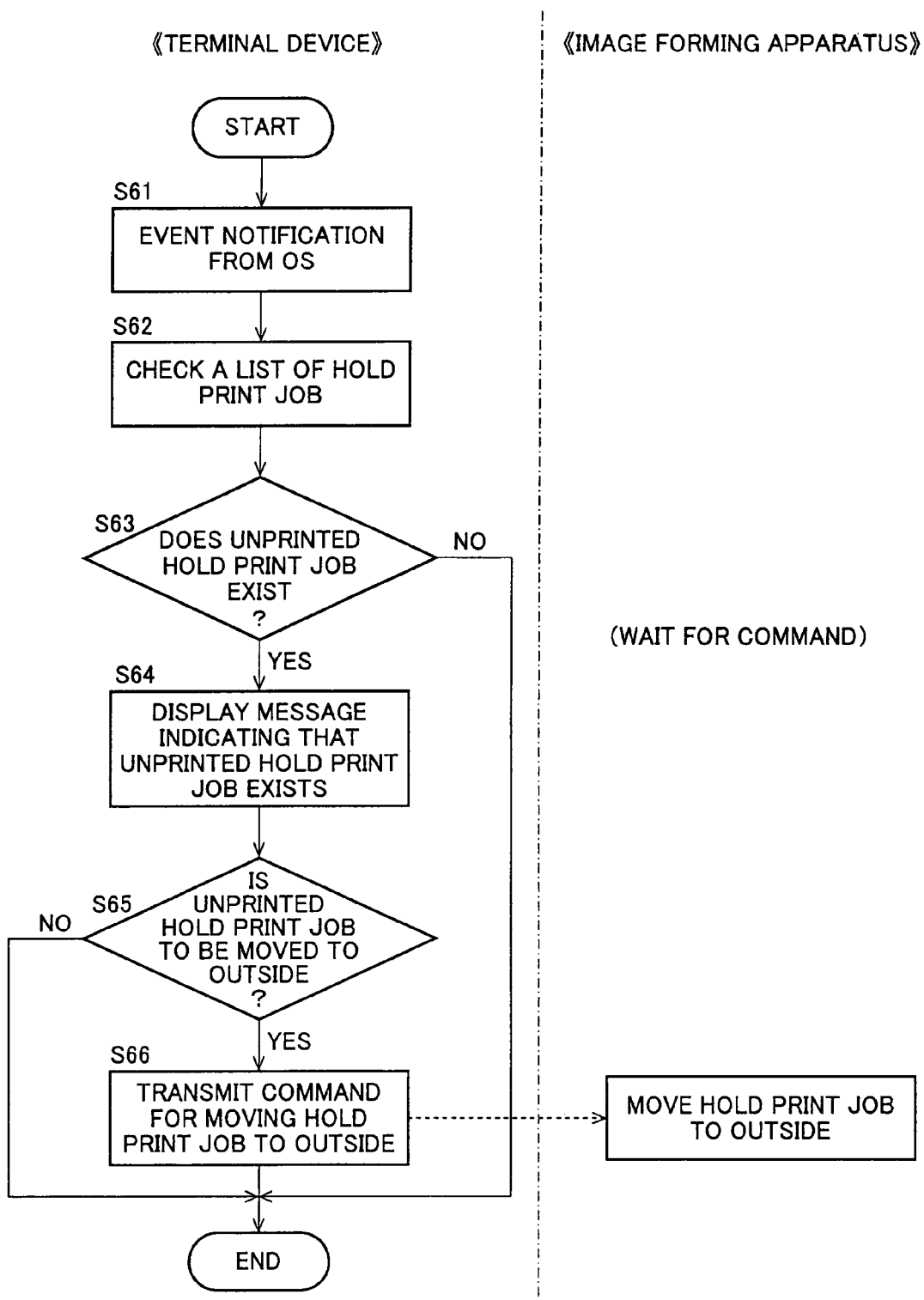
FIG. 17 is a flow diagram in the case of making outwards movement specification selectable when displaying the message informing that an unprinted hold print job exists.
Figure 18:
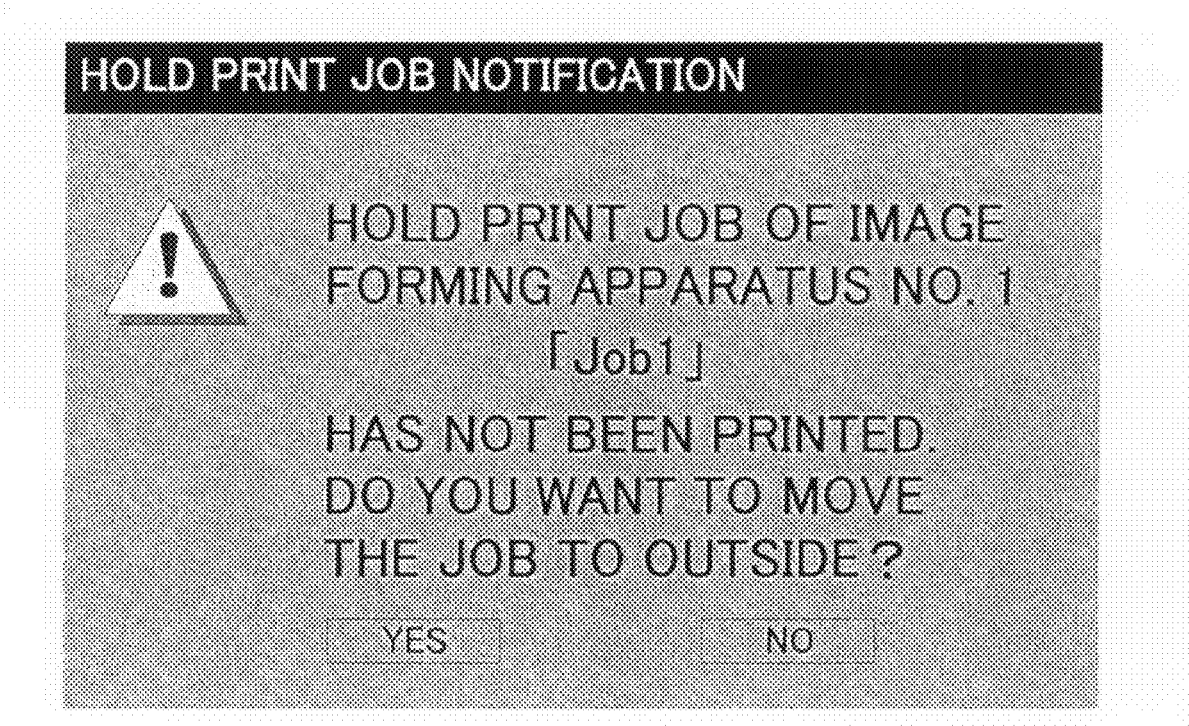
FIG. 18 depicts a display example in the case of making outwards movement specification selectable when displaying a message informing that an unprinted hold print job exists.

FIG. 17 is a process flow of the hold print job processing unit 14 displaying the message informing that an unprinted hold print job exists and enabling outwards movement specification of the hold print job, and the description thereof will be omitted since the flow becomes to be the same as that shown in FIG. 11 by replacing "deletion" of the hold print job at steps S25 and S26 of the flow diagram of FIG. 11 with "outwards movement" at steps S65 and S66 of FIG. 17. FIG. 18 depicts a message display example in the case of enabling the outwards movement specification of the hold print job. FIG. 19 is a flow of automatically transmitting the command for moving the hold print job to the outside concurrently with displaying the message indicating that the unprinted hold print job exists, and the description thereof will be omitted since the flow becomes to be the same as that shown in FIG.

17 by eliminating the step S65 from the flow of FIG. 17 (step S75 does not exist in the flow of FIG. 19).

If in the examples shown in FIGS. 11 to 19, the processing is executed in accordance with a remaining capacity of the hard disk or the retention period, the hold print job can more reasonably be managed. The above selection buttons for "deletion", "compression", and "outward movement" of the hold print job may be displayed at the same time to allow the user to select any one of them.

A second embodiment of the present invention will be described with reference to FIGS. 20 and 21. FIG. 20 is a block diagram of an image forming apparatus according to the second embodiment of the present invention, and this image forming apparatus 2' is different from the image forming apparatus 2 of the first embodiment shown in FIG. 3 in the point that the image forming apparatus 2' provides a hold print job information managing unit 30 that includes a function of managing the hold print job and indicating the hold print job information to the user relevant to the job in such a case that a hold print job sender provides the image forming apparatus with the hold print job so that the hold print job is printed by a plurality of users.

If the image forming apparatus 2' receives a hold print job causing a plurality of users to print the hold print job, the hold print job processing analyzing unit 23 analyzes the job, stores the hold print job in the hold print job storage unit 25, and the hold print job information such as sender information, a job name, a password used at the time of printing, information of users that should print the job, and the term of printing described in the header portion of the hold print job is extracted, and is stored and managed in the hold print job information managing unit 30. The hold print job information and a message indicating that the hold print job has arrived are transmitted to the user terminal devices relevant to the job or logged-in users.

The operational processing of the hold print job controlling unit 24 in this case will be described with reference to a flowchart of FIG. 21. When a hold print job addressed to m users is received from a terminal device A (step S81), the hold print job is stored and the above hold print job information is stored and managed (step S82); N is set to "1" (step S83); and the terminal devices (B, C, . . . ) of m users are informed of the arrival of the hold print job along with the hold print job information (step S84). If a user of the terminal devices (B, C, . . . ) performs the hold print (step S85/Y), N is incremented by one (step S86); a print completion notification is sent to the terminal device of the user who has performed the hold print (step S87); and if a value of N is not m, the process goes back to step S85 to wait for the hold print by another user. Since the N value becomes m if the hold print is performed by all the users that should print the job, the process goes from step S88 to step S89, and the terminal device A of the hold print job sender is notified of the completion of the hold print of the hold print job to terminate the process.

In the second embodiment, a warning message may be transmitted to the terminal device of a user or a logged-in user who does not complete the print even when the term of printing has expired. If a command for deleting the hold print job is transmitted from the terminal device A when the terminal device of the hold print job sender is given the information about completion of printing, a processing is executed for deleting the hold print job stored in the hold print job storage unit 25.

As described above, according to the present invention, when printing of a hold print job is forgotten by a user that should print the job, the user can certainly be informed thereof, and if one hold print job is printed by a plurality of users, the hold print job is collectively managed by the image forming apparatus and, therefore, the burden of the hold print job sender is reduced.

According to the present invention, since a message is displayed to indicate that an unprinted hold print job exists every time a predetermined event occurs which are preliminarily registered in the terminal device, the omission of printing by a user can certainly be prevented.

Besides displaying the message for preventing omission of printing deletion, compression, and outwards movement of the hold print job can be specified and therefore, such situations can be prevented from occurring that the hard disk and memory of the image forming apparatus are occupied and that other functions such as scanning utilizing the hard disk cannot be used.

Even when the hold print job is transmitted to a plurality of image forming apparatuses, whether the job is printed can be checked on the terminal device without going to the site where each of the image forming apparatuses is equipped.

According to the present invention, since the hold print job information stored in the hold print job information managing unit of the terminal device is updated with the latest hold print job information from the image forming apparatus when a predetermined event occurs in the terminal device, accurate information can be used to inform users of unprinted information.

According to the present invention, if a hold print job sender is different from users that should print the job, the image forming apparatus performs the entire management of the hold print job, including management of whether all the users relevant to the job have completed printing the job, and therefore, the burden of the hold print job sender is considerably reduced.

The invention claimed is:

1. An image forming apparatus connected to a plurality of terminal devices through a network, the image forming apparatus having a hold print function, the image forming apparatus comprising:
   a storage unit having stored thereon a hold print job transmitted from one of the terminal devices; and
   a hold print job controlling unit that controls processing of the hold print job, wherein
   the hold print job controlling unit analyzes the transmitted hold print job and extracts hold print job information including at least information that identifies the hold print job and information of a user that should print the hold print job,
   transmits the hold print job information to the one terminal device that sent the hold print job and a terminal device of the user that should print the hold print job,
   transmits a print completion notification to the terminal device of the user that should print the hold print job each time printing of the hold print job is executed by the user that should print the hold print job, and
   transmits another print completion notification, if printing of the hold print job is executed by all users designated to print the hold print job, to the one terminal device that sent the hold print job.

2. The image forming apparatus as defined in claim 1, wherein the information that identifies the hold print job includes at least one of a hold print job sender, a hold print job name, and a password for printing the hold print job.

3. The image forming apparatus as defined in claim 1, wherein if printing term information is included in the hold print job, the printing term is included in the hold print job information to be transmitted to the user that should print the hold print job.

4. The image forming apparatus as defined in claim 3, wherein if printing of the hold print job is not executed during the printing term, a warning message indicating that the hold print job to be printed has not yet been printed is transmitted to the terminal device of the user that should print the hold print job.

5. An image forming system in which a plurality of terminal devices are connected through a network to an image forming apparatus having a hold print function, the image forming apparatus comprising:

a storage unit having stored thereon a hold print job transmitted from one of the terminal devices; and a hold print job controlling unit that controls processing of the hold print job, wherein the hold print job controlling unit analyzes the transmitted hold print job and extracts hold print job information including at least information that identifies the hold print job and information of a user that should print the hold print job, transmits the hold print job information to the one terminal device that sent the hold print job and a terminal device of the user that should print the hold print job, transmits a print completion notification to the terminal device of the user that should print the hold print job each time printing of the hold print job is executed by the user that should print the hold print job, transmits another print completion notification, if printing of the hold print job is executed by all users designated to print the hold print job, to the one terminal device that sent the hold print job, and the one terminal device receives the hold print job information and the another print completion notification which are transmitted from the image forming apparatus, and displays a print execution state of the hold print job based on the received hold print job information and the another print completion notification when a predetermined event has occurred in the one terminal device.

* * * * *